United States Patent [19]

Krikke et al.

[11] Patent Number: 5,017,178
[45] Date of Patent: May 21, 1991

[54] RESILIENT COUPLING APPARATUS

[75] Inventors: Roger D. Krikke; Benny Ballheimer; Nelson A. Jones, all of Peoria; Dwight V. Stone, East Peoria, all of Ill.

[73] Assignee: Caterpillar Inc., Peoria, Ill.

[21] Appl. No.: 423,520

[22] Filed: Oct. 13, 1989

Related U.S. Application Data

[63] Continuation of Ser. No. 260,426, Oct. 19, 1988, abandoned.

[51] Int. Cl.$^5$ .......................... F16D 3/12; F16D 3/80; F16H 57/00; F16H 57/04
[52] U.S. Cl. .......................... 464/7; 74/411; 74/467; 464/27; 464/66; 464/81
[58] Field of Search ............. 74/411, 467; 464/7, 464/24, 27, 66, 81

[56] References Cited

U.S. PATENT DOCUMENTS

| | | | |
|---|---|---|---|
| 1,282,571 | 10/1918 | Guay | 464/66 X |
| 1,646,772 | 10/1927 | Sheppy | 464/66 |
| 2,305,439 | 12/1942 | Miller | 464/24 |
| 2,702,995 | 3/1955 | Biedess | 74/411 X |
| 2,731,256 | 1/1956 | Alcock | 464/66 X |
| 2,895,316 | 7/1959 | Kloud | 464/68 |
| 3,528,265 | 9/1968 | Brinson | 464/27 |
| 4,589,296 | 5/1986 | Sato et al. | 74/411 |

FOREIGN PATENT DOCUMENTS 52-41753 3/1977 Japan .................... 464/66

Primary Examiner—Daniel P. Stodola
Attorney, Agent, or Firm—Larry G. Cain

[57] ABSTRACT

The existing couplings used for transmission of torque uses a combination of mechanical springs or a combination of dampening devices such as cylindrical openings having pistons spring-biased therein. The cylindrical openings also have viscous fluid introduced therein and dampen the torque applied thereto. A coupling apparatus is provided for resiliently transmitting torque including a pin assembly positioned in mechanical connection between an annular plate member and a gear member, dampening backlash motion including a pin assembly and a mechanism for biasing a piston into contact with one of the gear member or annular plate member, and lubricating the interface between the components having relative oscillation therebetween. An interface between the moving parts, the annular plate and the gear, is providing and a lubrication system is provided to lubricate the interface.

20 Claims, 2 Drawing Sheets

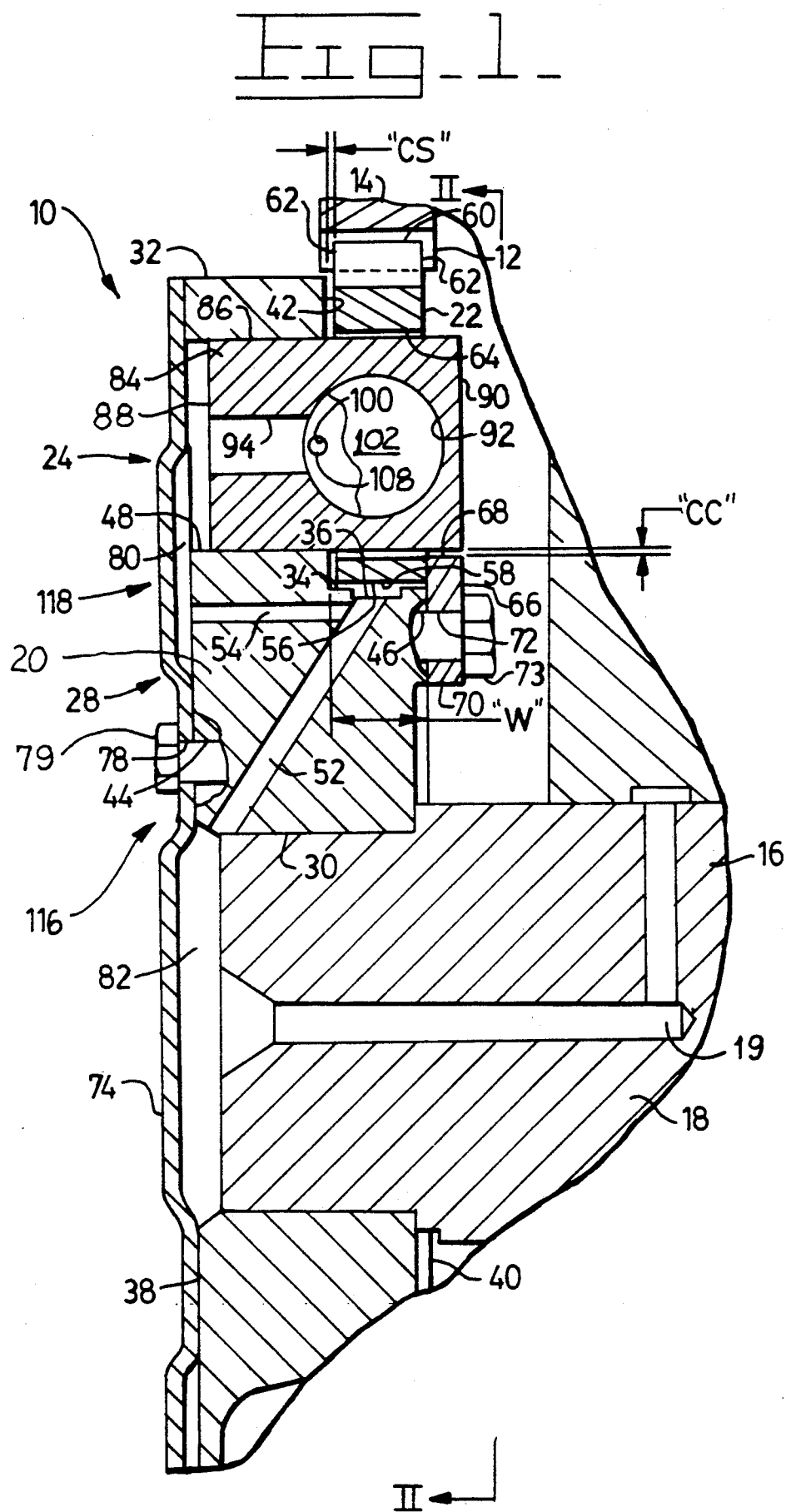

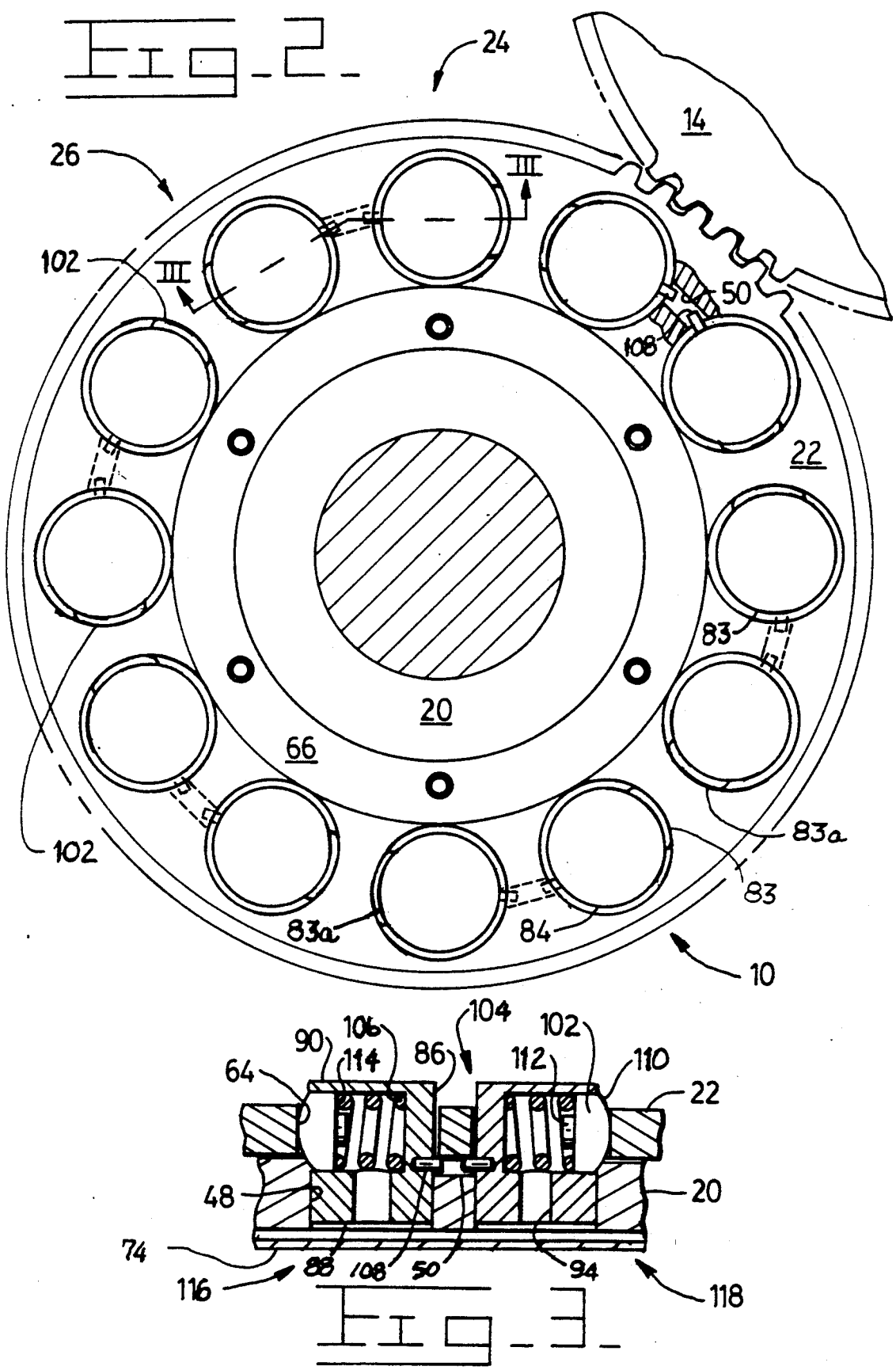

RESILIENT COUPLING APPARATUS

This is a continuation of Application No. 07/260,426, filed Oct. 19, 1988, now abandoned.

TECHNICAL FIELD

This invention relates generally to a coupling apparatus and more particularly to the resilient transmission of torque from a driving mechanism to a driven mechanism and dampening a backlash from the driven mechanism to the driving mechanism.

BACKGROUND ART

In internal combustion engines, critical torsional vibrations can increase noise, reduce gear life and cause premature engine failure. For example, the torque being transmitted to drive a camshaft of an engine starts out low and increases until a cam lobe activates a valve. The higher the loads required to activate the valve the greater the torsional loads which must be overcome by the camshaft. The constant variation of loads on the camshaft from high loads when the force of the valve springs and the springs of the unit injectors are being compressed to no load when the springs are expanded and the valves are closed results in a wide range of working forces acting on the camshaft. Thus, the results of the torsional load causes a windup of the camshaft and once the resisting load is overcome the windup of the camshaft will cause the camshaft to unwind or backlash. The camshaft becomes an instantaneous driving member rather than a driven member further inducing impact loads on the driving and driven members resulting in increased noise, reduced gear life and premature engine failure.

An example of a coupling used for dampening torsional oscillations is disclosed in U.S. Pat. No. 2,895,316 issued to Jan Kloud, et.al. on July 21, 1959. In this coupling, an elastic coupling with mechanical springs for dampening torsional oscillations is shown.

In another example a viscous dampening means is disclose in U.S. Pat. No. 3,528,265 issued to Leo device a coupling mechanism is adapted to reduce and absorb vibratory motion in a drive shaft. The dampener has a plurality of openings having a pair of similar, oppositely disposed pistons therein. Each piston is spring-biased inwardly for slidably receiving a connecting pin therebetween. In addition there is a passage leading to at least one chamber formed by the walls of the cylindrical opening and pistons for introducing a viscous fluid therein. Each chamber has an outlet to discharge a measured amount of fluid and controlling the amount of fluid in each chamber.

The art as cited above does not recognize a further problem which exists with dampeners having contacting components therein and having relative motion therebetween. Such relative motion causes friction, noise, wear and decreases the life of the components having relative motion therebetween.

The present invention is directed to overcome one or more of the problems as set forth above.

DISCLOSURE OF THE INVENTION

In one aspect of the present invention, a coupling apparatus for coupling a driving mechanism to a driven mechanism comprises an annular plate rigidly connected to the driven mechanism; a gear adapted to be drivingly connected to the driving mechanism and connected to the annular plate for relative oscillation therebetween wherein an operating clearance between the annular plate and the gear forms an interface therebetween; means for resiliently transmitting torque from the gear to the annular plate; means for dampening a backlash motion from the annular plate to the gear; and means for lubricating the interface between the annular plate and the gear with the lubricating means including a fluid passage in the annular plate communicating with the interface and adapted to be connected to a source of lubricating fluid.

The present invention provides a coupling apparatus for resiliently transmitting torque, dampening backlash motion, and lubricating the interface between the components having relative oscillation therebetween. The apparatus reduces friction, noise and wear and increases the life of the components. Thus, the use of such a device in an engine or compressor improves the efficiency and reliability, and reduces noise and downtime.

BRIEF DESCRIPTION OF THE DRAWINGS

FIG. 1 is a sectioned view of an embodiment of the present invention;

FIG. 2 is an partially sectioned end view taken along line II—II of FIG. 1;

FIG. 3 is a cross-sectional view taken along line III—III of FIG. 2.

BEST MODE FOR CARRYING OUT THE INVENTION

A coupling apparatus 10 couples a driving mechanism 12, which in this application is one of the timing gears 14 of an engine, not shown, to a driven mechanism 16, which in this application is a camshaft shown in part at 18. It should be understood that the mechanisms 12 and 16 may be reversed and the driving mechanism 12 acts as a driven mechanism while the driven mechanism 16 acts as a driving mechanism. The coupling apparatus 10 is removably press fitted to the camshaft 18. The camshaft 18 is rotationally positioned in an engine in a conventional manner and has a fluid passage 19 therein connected to a source of lubricating fluid such as an engine oil pump, not shown. The camshaft 18 has a plurality of cam lobes thereon, not shown, in frictional contact with a plurality of spring biased intake valves, exhaust valves and fuel injectors, also not shown. The valves are biased to a closed position and the injectors are biased to a filling position.

As more clearly shown in FIG. 1 and FIG. 2, the coupling apparatus 10 includes an annular plate member 20 rigidly removably press fitted to the camshaft 18, a ring gear 22 member adapted to be drivingly connected with a crankshaft, not shown, through the timing gear 14, means 24 for resiliently transmitting torque from the ring gear 22 to the annular plate 20, means 26 for dampening backlash from the annular plate 20 to the ring gear 22, and means 28 for lubricating the interface between the annular plate 20 and the ring gear 22.

The annular plate 20 has an inner bore 30 therein, an outer cylindrical surface 32 and a cylindrical surface 34 intermediate the bore 30 and the surface 32. The cylindrical surface 34 has a pre-established width "W". An annular groove 36 is provided in the cylindrical surface 34 of the annular plate 20. The annular plate 20 further has first and second sides 38, 40 and a recessed surface 42 intermediate the sides 38, 40 and extending radially outwardly from the cylindrical surface 34. The annular plate 20 has a plurality of threaded holes 44 therein opening at the first side 38 and a plurality of threaded holes 46 therein opening at the second side 40. A plurality of through bores 48 are circumferentially outwardly positioned from the cylindrical surface 34 in the annular plate 20 and open at the first side 38 and the recessed surface 42. The bores 48 are provided in pairs with each pair of bores being interconnected by a groove 50 positioned in the recessed surface 42. A first fluid passage 52 opens into the bore 30 in the annular plate 20 and communicates with the annular groove 36. A second fluid passage 54 being smaller in diameter than the fluid passage 52 opens at the first side 38 and intersects the fluid passage 52.

The ring gear 22 has a center bore 56 therein defined by a cylindrical surface 58. The ring gear 22 further has an external toothed profile 60, a pair of sides 62 and a plurality of through bores 64 therein extending between the sides 62. The bores 64 are slightly larger than the bores 48 in the annular plate and are axially aligned with the bores 48. The bores 64 are circumferentially spaced about the center bore 56. Thus, any pair of the bores 64 are axially aligned with a corresponding pair of the bores 48 in the annular plate 20. The ring gear has a width which is less than the width "W" of the cylindrical surface 34 of the annular plate 20. The cylindrical surface 58 of the gear 22 and the cylindrical surface 34 of the annular plate 20 establish an operating clearance "CC" therebetween. Furthermore, the width "W" of the cylindrical surface 34 and the width of the ring gear 22 establish an operating clearance "CS" between the recessed surface 42 and the adjacent side 62. The operating clearances "CS" and "CC" are combined to form an interface between the annular plate 20 and the gear 22. The operating clearances "CS" and "CC" are exaggerated as shown in FIG. 1 for illustrative purposes and in practice are generally less than 1 mm.

The ring gear 22 is axially retained on the annular plate 20 by an annular retainer 66. The retainer 66 has a outer circular profile 68 slightly larger than the cylindrical surface 58 of the ring gear 22 and an inner circular profile 70 smaller than the cylindrical surface 34 of the annular plate 20. A plurality of through holes 72 corresponding with the plurality of threaded holes 46 in the annular plate 20 are positioned in the retainer 66 and a plurality of fasteners 73 attach the retainer 66 to the annular plate 20. A cover 74 has a plurality of through holes 78 corresponding with the plurality of threaded holes 46 in the annular plate 20 and a plurality of fasteners 79 attach the cover 74 to the annular plate 20. An annular chamber 80 is formed between the cover 74 and the annular plate 20. The annular chamber 80 connects the through bores 48 with the second passage 54 in the annular plate 20. A chamber 82 is formed between the cover 74 and the annular plate 20. The chamber 82 connects the passage 52 in the annular plate 20 to the passage in the camshaft 18.

The means 28 for lubricating the interface between the annular plate 20 and the ring gear 22 includes the operating clearance or space "CS" between the recessed surface 42 of the annular plate 20 and the adjacent side 62 of the gear 22, operating clearance or space "CC" between the cylindrical surface 34 of the annular plate 20 and the cylindrical surface 58 of the ring gear 22, the annular groove 36 positioned in the cylindrical surface 34, the first fluid passage 52 and the chamber 82. The means 28 for lubricating is adapted to be connected to the source of lubricating fluid. As an alternative, the annular groove 36 could be positioned in the cylindrical surface 58.

The means 24 for resiliently transmitting torque from the ring gear 22 to the annular plate 20 includes a plurality of pin assemblies 83 individually positioned in one of the pairs of the bores 48 of the annular plate 20 and the axially aligned bores 64 in the gear 22. The means 26 for dampening a backlash motion also includes a plurality of pin assemblies 83a individually positioned in the other of the pairs of bores 48 of the annular plate 20 and the axially aligned bores 64 in the gear 22. The pin assemblies 83, 83a are identical in construction and common reference numerals will be applied to the components of the pin assemblies 83 and 83a. Each of the pin assemblies 83 and 83a includes a cylindrical pin 84 slidably positioned in the respective bore 48 and extends into the respective bore 64. The pin 84 further has an outer surface 86 and first and second ends 88, 90. A blind radial bore 92 opens at the outer surface 86 of the pin 84 and an axial bore 94 passes through the first end 88 and opens into the radial bore 92. A blind radially extending hole 100 is positioned between the ends 88, 90 and opens at the outer surface 86 of the pin 84. The pin assemblies 83 and 83a further include a piston 102 slidably positioned in the bore 92 and a means 104 for biasing the piston 102 into contact with the ring gear 22. The means 104 for biasing the piston 102 into contact with the ring gear 22 is a compression spring 106 captively positioned between the piston 102 and the blind radial bore 92. The piston 102 is slidably positioned in the radial bore 92 and has a spherical end 110 contacting the ring gear 22 and a stem 112 and an outer contacting surface 114 positioned at the end opposite the spherical end 110. A dowel 108 is press fitted in the hole 100 and protrudes outwardly past the outer surface 86 of the pin 84 and into the groove 50 in the recessed surface 42. As best shown in fig 2, the positioning of the dowel 108 in the groove 50 insure that the spherical end 110 of the piston 102 of the piston assemblies 83 and 83a are orientated properly to contact the ring gear 22. The ring gear 22 traps the dowel 108 within the groove 50 and axially aligns the pin assemblies 83 and 83a. As an alternative, the cylindrical pin 84 could be of any configuration such as a square or a hex shape, furthermore, the spring could be a plurality of belleville washers. As another alternative, the pin assemblies 83 and 83a of the means 24 and the means 26 are individually positioned in one of the pairs of the bores 64 of the gear 22 and axially aligned bores 48 in the annular plate 20. Thus, the piston 102 is biased into contact with the annular plate 20.

As more clearly shown in FIG. 1 and 3, the means 24 for resiliently transmitting torque and the means 26 for dampening backlash motion further includes a means 116 for viscously dampening movement of the pistons 102 in the radial bores 92. The means 116 for viscously dampening includes the retainer 66, the axial bore 94 passing through the first end 88 of the pin 84 and a means 118 for connecting the axial bore 94 to the source of lubricating fluid. The means 118 for connecting the axial bore 94 to the source of lubricating fluid includes the bore 48, the annular chamber 80, the first fluid passage 52, the second passages 54 and the chamber 82. The means 116 for viscously dampening is adapted to be connected to the source of lubricating fluid.

Industrial Applicability

In use, the timing gear 14 is rotatably driven by the engine in the usual manner and this rotatably drives the gear 22 of the coupling apparatus 10. The pin assemblies 83 in turn transmits the driving torque from the gear 22 into the plate 20 causing it to rotate the camshaft 18. More specifically the torque from the gear 22 is transmitted through the pistons 102, springs 106, pins 84 and into the plate 20 causing rotation of the camshaft 18. Immediately prior to one of the lobes starting to compress the valve springs, the relative position of the components of the coupling 10 is essentially as shown in the drawings. However, as the force necessary to rotate the camshaft 18 increases due to the resistance of the valve springs the spring 106 of the resilient means 24 starts to compress allowing the ring gear 22 to move relative to the annular plate 20. The cam profile of the lobes on the camshaft progressively compresses the springs of the valves and the injectors. The increasing resistance of the springs cause the camshaft to windup and torsionally absorb a portion of the force. At a particular position of the lobe, as the camshaft continues to rotate the lobe compresses the valve springs to their maximum and shortly thereafter the profile of the lobe allows the force previously absorbed by the camshaft to instantaneously unwind or backlash. Thus, the load is transmitted from the camshaft 18 through the annular plate 20, pistons 102 and is absorbed in the springs 106 of the dampening means 24. The resilient means 24 absorbs the variations of load and torque transmitted from the engine and the dampening means 26 absorbs the backlash from the camshaft 18.

The means 116 for viscously dampening the piston 84 is combined with the resilient means 24 and the dampening means 26 to aid in absorbing loads from the engine and the camshaft 18. The lubricating fluid from the engine oil pump flows through the passage in the camshaft 18 and enters the chamber 82. The fluid then flows through the first passage 52, into the second passage 54, into the annular chamber 80 through the axial bore 94 and into the radial bore 92 around the spring 106 and between the piston 102 and bottom of the bore 92 in the pin 84. Thus, the fluid, engine oil under pressure, is trapped between the piston 102 and the bottom of the bore 92 and acts as a viscous dampener and further modulates the varying loads and impact loads transferred to and from the camshaft 18.

Lubrication from the engine oil pump lubricates the interface between the annular plate 20 and the ring gear 22. The lubricating fluid from the pump passes through the fluid passage in the camshaft 18 and enters into the chamber 82. Fluid then flows through the fluid passage 52 in the annular plate 20 enters into the annular groove 36 and provides a continuous film of oil to the operating clearance "CC" between the cylindrical surfaces 34 and 58 of the annular plate 20 and the ring gear 22 respectively. A portion of the lubricating fluid also flows into the operating clearance "CS" between the recessed surface 42 and the side 62 of the annular plate 20 and the ring gear 22 respectively.

Variations in load and impact loads are absorbed by the coupling apparatus 10 resulting in reduced noise and increased life of components. The lubrication of the interface reduces friction, noise and increases life of components having relative motion therebetween.

Other aspects, objectives and advantages of this invention can be obtained from a study of the drawings, the disclosure and the appended claims.

We claim:

1. A coupling apparatus for coupling a driving mechanism to a driven mechanism, comprising:

an annular plate member rigidly connected to the driven mechanism;

a gear member adapted to be drivingly connected to the driving mechanism and connected to the annular plate for relative oscillation therebetween wherein an operating clearance between the annular plate and the gear forms an interface therebetween;

means for resiliently transmitting torque from the gear to the annular plate, said resilient transmitting means includes a pin assembly positioned in mechanical connection between the annular plate member and the gear member;

means for dampening a backlash motion from the annular plate to the gear, said dampening means includes a pin assembly, piston, operatively associated with the pin assembly and means for biasing the piston into contact with one of the members; and means for lubricating the interface between the annular plate and the gear, said means including a fluid passage in the annular plate communicating with the interface and adapted to be connected to a source of lubricating fluid.

2. The coupling apparatus of claim 1 wherein said annular plate has a cylindrical surface and said gear has a cylindrical surface positioned in osicllationally movably relationship to the cylindrical surface of the annular plate and a portion of the operating clearance includes a space "CC" therebetween which forms at least a portion of the interface.

3. The coupling apparatus of claim 2 wherein said annular plate and said gear each includes a respective recessed surface and side and a space "CS" therebetween forming a portion of the operating clearance and forming an additional portion of the interface.

4. The coupling apparatus of claim 3 wherein said means for lubricating the interface between the annular plate and the gear includes an annular groove positioned in one of the cylindrical surfaces.

5. The coupling apparatus of claim 2 wherein said annular plate has a pair of bores therein and said gear has a pair of bores therein being axially aligned with the pair of bores in the plate.

6. The coupling apparatus of claim 5 wherein said means for resiliently transmitting torque is positioned in one bore of the pair of bores of one of the gear and the annular plate and the means for dampening a backlash motion is positioned in the other bore of the pair of bores of said one of the gear and the annular plate.

7. The coupling apparatus of claim 6 wherein said means for resiliently transmitting torque from the gear to the annular plate has the assembly positioned in the one of the bores of the annular plate and the gear and extending into a corresponding one of the axially aligned bores in the gear and the annular plate, said pin assembly includes a pin having an outer surface, a blind radial bore opening at the outer surface and being generally aligned with one of the gear or the annular plate, a piston slidably positioned in the radial bore and means for biasing the piston into contact with one of the gear or the annular plate.

8. The coupling apparatus of claim 7 wherein said one of the bores is the bore in the annular plate.

9. The coupling apparatus of claim 7 wherein said means for resiliently transmitting torque from the gear to the annular plate further includes means for viscously dampening the piston in the radial bore.

10. The coupling apparatus of claim 9 wherein said means for viscously dampening the piston in the radial bore includes an axial bore passing through the end of the pin and opening into the radial bore of the pin, and means for connecting the axial bore to the source of lubricating fluid.

11. The coupling apparatus of claim 10 wherein said means for connecting the axial bore to the source of lubricating fluid includes a fluid passage positioned in the annular plate and a chamber positioned between the bore and the fluid passage, said fluid passage being adapted to be connected to the source of lubricating fluid.

12. The coupling apparatus of claim 7 wherein said means for resiliently transmitting torque from the gear to the annular plate further includes a radially extending hole in the pin, a groove extending between the pair of bores in the annular plate and a dowel positioned in the hole and extending into the groove.

13. The coupling apparatus of claim 7 wherein said means for biasing the piston into contact with the gear is a compression spring captively positioned between the piston and the blind bore.

14. The coupling apparatus of claim 7 wherein said means for dampening backlash motion from the annular plate to the gear includes the pin assembly positioned in the other bore of the pair of bores of the annular plate and the gear and extending into a corresponding other bore of the axially aligned pair of bores in the other one of the gear and annular plate, said pin assembly includes a pin having an outer surface, a blind radial bore opening at the outer surface and being generally aligned with one of the gear or the annular plate, the piston slidably positioned in the radial bore and means for biasing the piston into contact with the gear.

15. The coupling apparatus of claim 14 wherein said means for dampening backlash motion from the annular plate to the gear further includes means for viscously dampening the piston in the radial bore.

16. The coupling apparatus of claim 15 wherein said means for viscously dampening the piston in the radial bore includes an axial bore passing through the end of the pin and opening into the radial bore of the pin, and means for connecting the axial bore to the source of lubricating fluid.

17. The coupling apparatus of claim 16 wherein said means for connecting the axial bore to the source of lubricating fluid includes a fluid passage positioned in the annular plate and a chamber positioned between the bore and the fluid passage, said fluid passage being adapted to be connected to the source of lubricating fluid.

18. The coupling apparatus of claim 14 wherein said means for dampening backlash motion from the annular plate to the gear further includes a radially extending hole in the pin, a groove extending between the pair of bores in the annular plate and a dowel positioned in the hole and extending into the groove.

19. The coupling apparatus of claim 14 wherein said means for biasing the piston into contact with the gear is a compression spring captively positioned between the piston and the blind bore.

20. The coupling apparatus of claim 2 wherein a retainer axially retains said ring gear onto the annular plate insuring the operating clearance therebetween.

* * * * *